Figure 1:
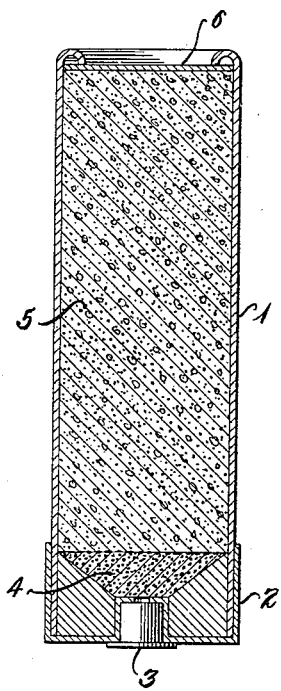

Oct. 3, 1939.   A. C. FISCHER   2,175,112
INSECTICIDE OR VERMIN DESTROYING SHELL

Filed Feb. 26, 1936

Inventor
Albert C. Fischer

By Knight Bros.
Attorneys

Patented Oct. 3, 1939

2,175,112

UNITED STATES PATENT OFFICE 2,175,112

INSECTICIDE OR VERMIN DESTROYING SHELL

Albert C. Fischer, Chicago, Ill.

Application February 26, 1936, Serial No. 65,842

10 Claims. (Cl. 102—12)

My invention relates to the novel means of destroying insects, caterpillars, vermin and other pests in inaccessible places, such as, tops of trees, eaves of houses; also to the destruction of hornet's nests, bumble bee nests, etc.

My invention is particularly directed to caterpillar tents and nests of moths and insects which do considerable damage to trees and vegetation, and which are often left unattended and undestroyed because of the difficulty and inconvenience in reaching them. My invention relates to a convenient method of effecting their destruction by the use of shot gun shells, which have the usual charge of powder but instead of having the shot incorporated therein will incorporate therein sand, gravel, insecticide powder, sand soaked in kerosene or mixed with flammable powders, oils, etc. The discharge of the gun would ignite the flammable material about the sand or gritty particles and carry to the object to be destroyed, the purpose being to have the sand pit the structure about the nests and carry some of the insecticide and flammable material to the surrounding nesting material.

I may prepare these shells without the flammable material and limit to a gritty substance and the insecticide, or I may coat the gritty substance with liquid insecticides mixing the gritty substance with a flammable powder and other insecticide, or I may mix the gritty substance with flammable oils and substances which will ignite the nest webs. I have particularly in mind the tent worm, which weaves a web and deposits therein its eggs, permitting the same to be hatched inside the gauze-like substance spun by the parent. Likewise undesirable nests or webs of various insects which may be formed in trees or otherwise.

My shells are prepared in much the same way as ordinary shells except that instead of being filled with lead or shot in some cases they would be filled with sand, in other cases with granular insecticide powder, and still others would be filled with mineral matter coated with oil, or a combination of the above. As far as expelling the contents of the shell is concerned the face of the shell would be constructed much the same as ordinary shells; the upper housing would contain the destroying chemicals and sand or gritty substance as a means of impressing those chemicals in the surrounding surface. In this manner the tent housing and these various nests may be destroyed from the ground, torn open and sprayed with insecticide, much more conveniently and readily than attempting to burn them out with torches and involving other risks in their destruction.

One of the features of my invention is to provide a means whereby the substance in the shell may flash on its way to the mark and in this manner cause fumes to be present at the time of contact with the mark. Or I may use a fuming cotton batting or other pellets which would adhere to the surrounding surface when shot, causing the same to fume and emit the fumes, thus also destroying these insects.

My invention relates to the novel means of providing a shell much the same as a shot gun shell, having an explosive cap, a chamber for powder, a chamber for the gritty sand and a chamber for the insecticides, either singly or in combination.

Figure 2:
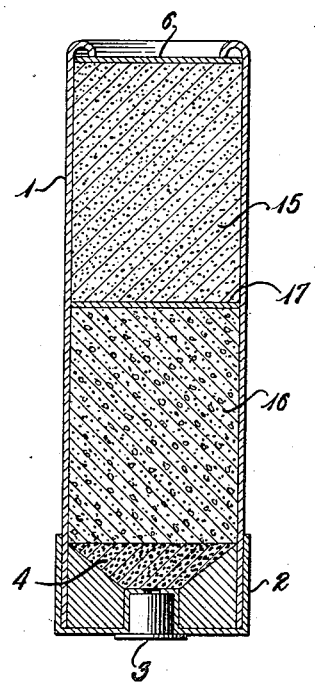

My invention may be illustrated by reference to the accompanying drawing wherein Figure 1 is a longitudinal sectional view of one embodiment thereof, and Figure 2 is a corresponding view of a different embodiment thereof.

In Figure 1 is shown a shell casing 1 provided with an end closure 2, with an explosive cap 3 disposed centrally thereof. A chamber is formed on the interior of the shell adjacent the detonating cap for receiving an explosive charge 4. The remainder of the shell is formed as a chamber 5 which may be closed by the disk 6 for receiving a mixture as disclosed above which may be a moist admixture of granular material and insecticide material with or without the addition of an inflammable material.

In Figure 2 is shown a shell casing similar to that shown in Figure 1. In this instance, the shell casing is divided into a plurality of chambers, such as 15 and 16, by a spacer disk 17. In the chamber 16 may be disposed the granular material for impelling the insecticide material disposed in chamber 15.

Having thus described my invention what I claim is:

1. A shell adapted to be discharged into places infested with undesirable animal life containing a mixture of granular material soaked in an inflammable medium with a vermin-destroying agent, and an explosive charge for propelling said mixture into such places.

2. A shell containing a mixture of a moist granular material coated with a vermin-destroying agent and an inflammable medium, and an explosive charge for propelling said mixture.

3. A shell containing a mixture of gritty material coated with a liquid insecticide and an inflammable powder, and an explosive charge for propelling said mixture.

4. A shell containing a mixture of a granular material soaked in an inflammable medium with a powdered insecticide, and an explosive charge for propelling said mixture.

5. A shell containing a mixture of granular material coated with a liquid insecticide, an inflammable powder and a powdery vermin-destroying agent, and an explosive charge for propelling said mixture into space.

6. A shell containing a moist mixture of granular material coated with an inflammable medium and an insecticide, and an explosive charge for propelling said mixture into space.

7. A shell comprising an explosive cap and provided with a chamber adjacent to said cap containing an explosive charge, a second chamber adjacent to said first chamber containing granular material and a third chamber adjacent to said second chamber containing insecticide material.

8. A shell comprising an explosive cap and provided with a chamber adjacent to said cap containing an explosive charge and a second chamber adjacent to said first chamber containing a moist mixture of granular material, inflammable material and a vermin-destroying agent.

9. A shell containing a mixture of granular material with a vermin-destroying agent, fume emitting pellets in said mixture adapted to give off fumes which are poisonous to said vermin, and an explosive charge in said shell for propelling said mixture and pellets into space.

10. A shell containing a mixture of granular material with an insecticide, cotton batting incorporated in said shell adapted to emit fumes poisonous to insects upon the discharge of said mixture, and an explosive charge in said shell for propelling said mixture and cotton batting into space.

ALBERT C. FISCHER.